United States Patent [19]

Reinsma et al.

[11] 4,327,921
[45] May 4, 1982

[54] PRESSURE BALANCED - CONSTANT ENGAGEMENT FORCE SEAL

[75] Inventors: Harold L. Reinsma, Dunlap; Ernest B. Clark, III, Peoria, both of Ill.

[73] Assignee: Caterpillar Tractor Co., Peoria, Ill.

[21] Appl. No.: 273,884

[22] PCT Filed: Dec. 8, 1980

[86] PCT No.: PCT/US80/01637

§ 371 Date: Dec. 8, 1980

§ 102(e) Date: Dec. 8, 1980

[51] Int. Cl.³ .......................... F16J 15/38; F16J 15/48
[52] U.S. Cl. .......................................... 277/3; 277/27; 277/82; 277/85; 277/92
[58] Field of Search .................. 277/3, 27, 38–41, 277/65, 81 R, 82, 84, 92, 85, 93 R, 95

[56] References Cited

U.S. PATENT DOCUMENTS

| | | | |
|---|---|---|---|
| 2,087,313 | 7/1937 | Bigelow et al. | 277/27 |
| 2,470,419 | 5/1949 | Voytech | 277/27 |
| 2,599,034 | 6/1952 | Wilkinson | 277/92 |
| 2,710,206 | 6/1955 | Huber | 286/11.1 |
| 2,814,513 | 11/1957 | Kupfert et al. | 286/11 |
| 3,136,389 | 6/1964 | Cummins | 188/72 |
| 3,157,404 | 11/1964 | Doble | 277/38 |
| 3,198,529 | 8/1965 | Voitik | 277/3 |
| 3,540,743 | 11/1970 | Ashton et al. | 277/92 |
| 3,926,443 | 12/1975 | Feverty et al. | 277/85 |
| 4,077,634 | 3/1978 | Durham | 277/92 |
| 4,212,475 | 7/1980 | Sedy | 277/96.1 |

Primary Examiner—Robert S. Ward, Jr.
Attorney, Agent, or Firm—Joseph W. Keen

[57] ABSTRACT

A seal apparatus (40) for sealing between relatively rotatable structures (12,14) is provided and has a pair of seal rings (62,64) which are engageable at axial sealing face portions (70,72). Axially facing surfaces (78,80) of the first seal ring (62) are arranged such that fluid pressure acting thereon biases it in a first direction. Axial positioning and circumferential retention of the second seal ring (64) is provided by an elastomeric toric (68) which is arranged radially between the second seal ring (64) and a retaining ring structure (46) which constitutes a part of the relatively rotatable structure (14). Axially facing surfaces (82,84,96) of the second seal ring (64) and the sealing toric (68) have areas in the axial direction which cause the second seal ring (64) to be pressure balanced in the axial direction by fluid pressure exerted thereon. A Belleville spring (88) is arranged axially between the retaining ring structure (46) and the second seal ring (64) and is prestressed to provide a constant axial force against the second seal ring (64). The toric (68) is engaged only on its radial extremes and thus may readily roll about its circular, central axis, but, when suitably radially compressed, will not readily slide circumferentially or axially relative to the second seal ring (64) and retaining ring structure (46).

10 Claims, 1 Drawing Figure

U.S. Patent
May 4, 1982
4,327,921
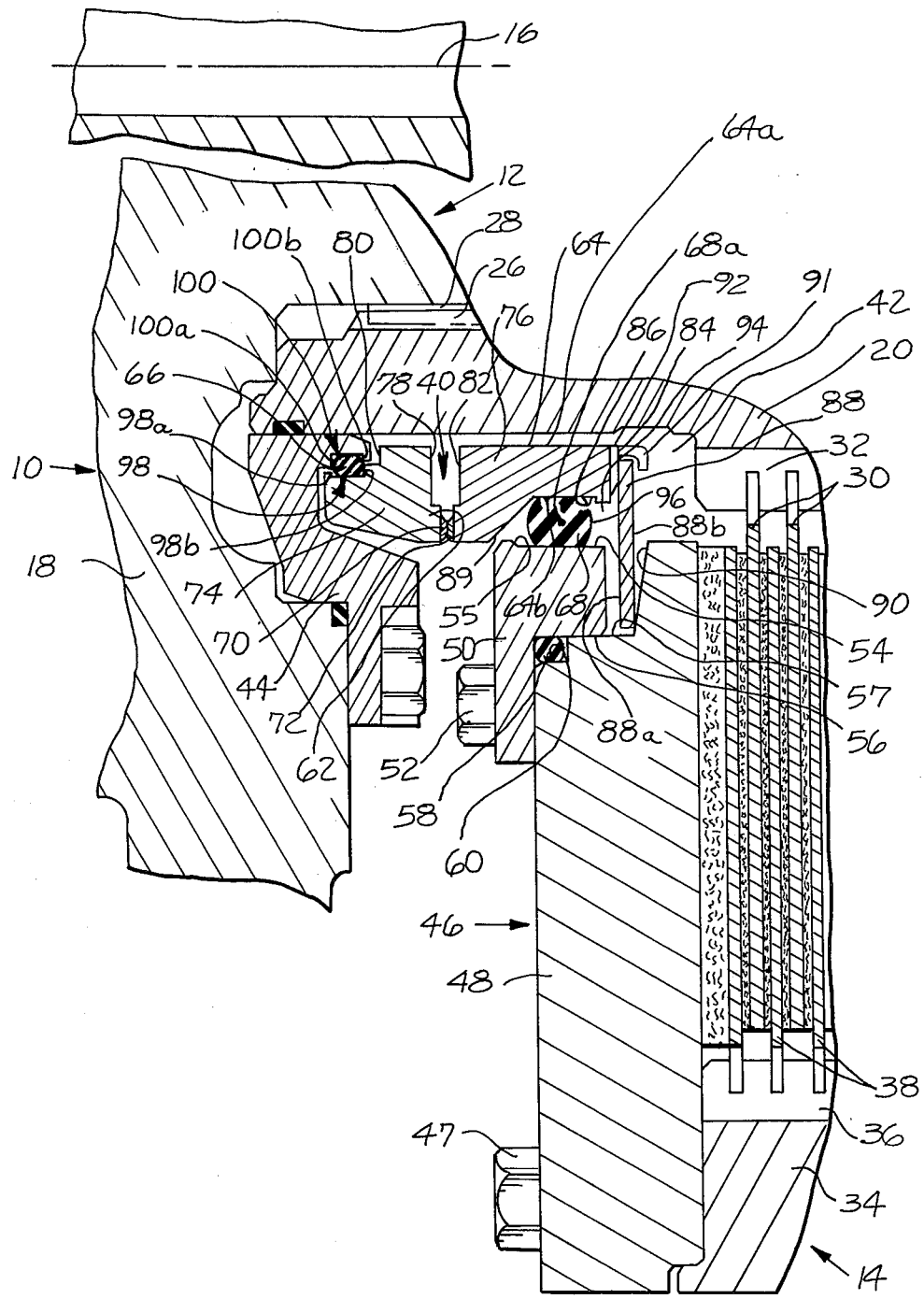

PRESSURE BALANCED - CONSTANT ENGAGEMENT FORCE SEAL

DESCRIPTION

1. Technical Field

This invention relates to sealing between large diameter, relatively rotatable members and, more particularly, to a pressure balanced, constant engagement force seal arrangement.

2. Background Art

In earthmoving equipment and other apparatus having large relatively rotatable structures, seal arrangements are often utilized to retain lubricant or coolant within the apparatus and prevent intrusion between the structures of debris and foreign particles. Effective sealing between relatively rotatable structures is necessary to avoid incurring expense in replacing the lubricant or coolant and prevent equipment damage caused by intruding debris.

In the past notable success has been attained in sealing between stationary and rotatable structures through the use of two relatively rotatable metallic seal rings which are urged axially together by a pair of elastomeric torics which are arranged between a rotatable seal ring and the rotatable structure and also between a stationary sealing ring and the stationary structure. Each of the torics engaged a seal ring and its cooperating structure along ramped surfaces which provided a force for biasing the seal rings together at an interface between a pair of sealing faces, one being associated with each seal ring. Examples of such dual seal rings being biased together by a pair of elastomeric torics include U.S. Pat. No. 4,077,634 which issued to Durham on Mar. 7, 1978, U.S. Pat. No. 3,540,743 which issued to E. Ashton on Nov. 17, 1970, and U.S. Pat. No. 3,136,389 which issued to C. F. Cummins on June 9, 1964, all of which are assigned to the assignee of the present invention. Such seal rings have typically been made entirely of a high grade steel alloy known in the trade as Stellite. While the aforementioned seals have performed admirably on relatively small diameter sealing applications such as track rollers for crawler tractors, larger diameter sealing rings of nearly two feet in diameter, such as are used for sealing the wheel and brake mechanisms on large off-highway trucks, have a less favorable sealing history.

The large diameter elastomeric toric-biased metal seal rings sometimes warp and prevent closure therebetween as a result of distortion mechanisms not fully understood. Other sets of seal rings are sometimes adversely affected by heat which caused their deformation to an out of round configuration and reduced the seal's effectiveness. The ramped biased surfaces on such seal rings are believed to provide some variation in the seal face load as the seal rings move axially such as when the seal faces wear.

U.S. Pat. No. 4,077,634 is directed toward maintaining a constant load on the seal faces and does so remarkably well for small and medium size seal rings. However, for large seal rings the face loading becomes more variant. Additionally, force balancing of the seal rings is difficult to achieve since the resilient torics which provide the biasing force engage ramped seal ring surfaces which have axial surface components. As such, the axial surface components on opposite ends of the seal rings are not usually uniformly exposed during movement of the torics so as to cause the sealing force to be affected by fluid pressure directed against those surfaces. Also, if, during assembly, the large torics are not precisely positioned or are not accurately manufactured, more or less axial area on the seal rings become exposed to fluid pressure and thus cause the seal rings to be unbalanced as regards fluid pressure directed against them.

U.S. Pat. Nos. 2,814,513 and 2,710,206 which were issued Nov. 26, 1957, and June 7, 1955, respectively, include axial biasing means for forcing the seal rings into axial engagement with a nonconstant force. U.S. Pat. No. 2,814,513 utilizes a coil spring while U.S. Pat. No. 2,710,206 utilizes an elastomeric O-ring for providing the axial engagement force. Neither of the aforementioned seal biasing means provides a substantially constant sealing force nor are the seal arrangements pressure balanced. Such designs perform satisfactorily for relatively small applications such as track rollers for endless track on crawler tractors.

U.S. Pat. No. 4,212,475 which issued July 15, 1980, illustrates a seal arrangement in which an elastomeric toric is disposed between two radially facing surfaces, one of which is on a seal ring. Application of a precise sealing force on the seal rings is difficult since the sealing force is provided by a spring having a force level dependent on its deformation. The problems encountered in applying a precise sealing force are accentuated by fluid pressure forces acting nonuniformly on the seal rings since such seal ring is not pressure balanced.

For large diameter applications the aforementioned seal arrangements have at least one of the following disadvantages: lack pressure balancing for seal ring movement; have a biasing means whose force varies with the position of the seal rings; and have biasing means for urging the seal faces together which is affected by fluid pressure exerted thereon.

DISCLOSURE OF THE INVENTION

In accordance with the present invention an improved seal arrangement for sealing between rotatable and stationary structures or between two relatively rotatable structures is provided in which one seal ring is axially urged toward and into sealing contact with another seal ring by a constant force biasing device. A sealing member is annularly arranged between one of the seal rings and one of the relatively rotatable structures. Each seal ring has a large body portion and a small seal face portion attached thereto.

The sealing member constitutes an axially rollable elastomeric toric which is in exclusive contact with two juxtaposed radially facing surfaces, one radially facing surface being on one of the seal rings and the other radially facing surface being on one of the structures. A spring for applying a constant and precise axial sealing force on the seal rings for axial displacements within a particular range is provided and includes opposably arranged axial surfaces of equal area which are subjectable to the same fluid pressure.

By providing a seal ring which is pressure balanced for practical axial operational positions and a sealing force which is substantially constant for varying axial displacements of the engaged seal rings, a precise sealing force can be applied so as to obtain an effective, highly reliable seal.

BRIEF DESCRIPTION OF THE DRAWING

The invention will be more fully understood from the following detailed description of a preferred embodiment, taken in connection with the accompanying drawing, in which FIG. 1 is a transverse vertical section of the present invention seal arrangement as it is embodied in a disc brake assembly from an off-highway truck.

BEST MODE FOR CARRYING OUT THE INVENTION

The present invention is concerned primarily with sealing between large diameter, relatively rotatable structures. Accordingly, in the description which follows, the invention is shown embodied in a disc brake arrangement 10 which is typically found in large, off-highway trucks. It should be understood, however, that the invention may be utilized as a sealing arrangement for relatively rotatable structures in any device.

Referring now to the drawing in detail, disc brake arrangement 10 includes a rotatable drive train structure 12 and a stationary foundation structure 14. While only one half of the disc brake arrangement 10 is shown, it is to be understood that such arrangement is actually annularly disposed about an axis of rotation 16 which symbolizes the center line of a vehicle axle (not shown). All surfaces and directions hereinafter described will be related to the axis of rotation 16.

Drive train structure 12 includes a radially arranged wheel rim 18 and brake disc support portion 20, which is axially adjacent rim 18. The brake disc support portion 20 is joined for rotation with wheel rim 18 by a plurality of teeth 26 which are integral with disc support portion 20 and which mesh with internal spline 28 which is integral with wheel rim 18. A plurality of brake discs 30 are each keyed on a plurality of external teeth 32 which extend radially outwardly from disc support portion 20.

Stationary foundation structure 14 constitutes a connecting shell 34 which has a plurality of radially directed internal teeth 36 formed thereon and a plurality of brake plates 38 which are interleaved with annular brake discs 30 and keyed to internal teeth 36.

A seal arrangement 40 cooperates with the drive train structure 12 and foundation structure 14 to seal coolant in a space 42 defined thereamong. A supply of such coolant is circulated through the interleaved brake discs and plates 30 and 38, respectively, to cool the same. The drive train structure 12 and foundation structure 14 respectively include a first and a second seal retainer structure 44 and 46 which are respectively joined to wheel rim 18 and the stationary connecting shell 34 by a plurality of threaded fasteners such as capscrews 47. The second or stationary retainer structure 46 includes an end plate 48 and a seal retainer 50 which is connected to end plate 48 by a plurality of threaded fasteners 52 (only one of which is shown). Seal retainer 50 has a radially inwardly facing seal surface 54 and a radially outwardly facing surface 56 which is sealed to end plate 48 by an O-ring 58 which is placed in an annular notch 60 formed on the radial interior of annular end plate 48. End plate 48 has a radially inwardly facing assembly surfaces 57 which is radially separated from seal surface 54. The seal surface 54 intersects with a retaining ramp surface 55 which extends, at a predetermined angle, toward axis 16 for reasons to be later discussed.

Seal arrangement 40 includes first and second annular seal rings 62 and 64 which are respectively sealed to the rotatable seal retainer structure 44 and the stationary seal retainer 50 by an O-ring 66 and elastomeric toric 68. The annular seal ring 64 has a radially inwardly facing inner periphery 64a and a radially outwardly facing outer periphery 64b coaxially arranged relative to the axis of rotation 16. The rotatable seal ring 62 has an axially facing sealing face portion 70 while stationary seal ring 64 has an axially facing sealing face portion 72 which is axially engageable with sealing face portion 70. Sealing face portions 70 and 72 preferably constitute hard facing alloys from the Aerospace Material Specification 4775B such as Colmony 6 or Haynes Stellite 43 as they are commonly known in the trade. Such material is metallurgically bonded to the body portions 74 and 76 of seal rings 62 and 64, respectively. Each of the seal ring body portions 74 and 76 make up the major portion of the seal rings and is a readily available material which is commonly joined to other materials and constitutes, by example, ordinary low carbon steel. The seal ring 62 includes a first axially facing surface 78 and an opposably arranged, smaller second axially facing surface 80 while the seal ring 64 has a first axially facing surface 82 which extends radially to the seal face portion 72 and a second axially facing surface 84 which is smaller in area than and opposably arranged relative to the axially facing surface 82. The outer periphery 64b of the seal ring 64 further includes a radially outwardly facing seal surface 86 which is juxtaposed relative to radially inwardly facing seal surface 54 of stationary seal retainer 50 and is in concentric relationship therewith. The sealing surface 86 intersects with a retaining ramp surface 89 which extends, at a predetermined angle, away from axis 16.

Elastomeric toric 68 constitutes a vulcanized rubber material which is in exclusive contact with the radially facing seal surfaces 54 and 86. Toric 68 has an outside diameter of about 21 inches by example and an exemplary diametral thickness of ½ inch which is compressed approximately 25% when it is assembled in the illustrated position. The compression of toric 68 increases the frictional engagement between it and seal ring 64 and between it and seal retainer 50 so as to prevent relative circumferential movement thereamong. Axial movement of seal ring 64 is accommodated by a rolling motion of toric 68 about its circular center line 68a. Such rolling produces a substantially zero axial force component on the seal ring 64.

A Belleville spring 88 having a first axially facing surface 88a and a second axial facing surface 88b is disposed axially between surface 84 and a retainer surface 90 which extends substantially radially inwardly and is a part of end plate 48. A plurality (preferably at least three) of retaining tabs 91 are joined to the axially facing surface 84 at selected circumferential positions at or near the inner periphery 64a of the seal ring 64. Axial surfaces 88a and 88b are in respective contact with surfaces 84 and 90. The Belleville spring 88 is stressed during assembly of seal arrangement 40 preferably to at least a radial configuration where its force level is substantially constant (varies only about 25% for axial spring positions within a range of 0.160 inches. Although only a single Belleville spring 88 is illustrated, it is to be understood that a plurality of such Belleville springs can be grouped together to provide the desired constant force effect. By judiciously choosing the maximum axial operational displacement of seal ring 64, at least one belleville spring 88 can be designed to operate in that displacement range with substantially constant force application.

A plurality of openings, only one of which is indicated by the reference numeral 92, extend from the radially inwardly facing periphery 64a to the radially outwardly facing periphery 64b of seal ring 64 so as to provide fluid communication and thus pressure transmission to a cavity 94 defined by the stationary structure 46, elastomeric toric 68, seal ring 64, and Belleville spring 88. Since the coolant communicates with both axial sides of Belleville spring 88, that spring is pressure balanced so as to be unaffected by any changes in pressure occurring in the coolant. A portion of the axial load (one-half) exerted by the coolant on a pressure balancing surface 96 of toric 68 is transmitted to seal ring 64 so as to act in concert with the axial force exerted by the coolant on axially facing surface 84 to counterbalance the force exerted on axially facing surface 82. Such counterbalancing makes seal ring 64 pressure balanced, and, thus, insensitive to pressure changes in the coolant which can result from varying operating conditions and temperatures.

A pair of annular notches 98 and 100 are individually formed in juxtaposed radially facing surfaces of seal ring 62 and retainer ring 44, respectively, so as to cooperatively form an enclosure within which O-ring 66 is housed. As can be seen, an axially facing side 100a of notch 100 is radially larger than an axially facing side 98a of notch 98 and an axially facing side 98b of notch 98 is radially larger than an axially facing side 100b of notch 100. Such structure restrains O-ring 66 within the cooperating notches and facilitates assembly of retaining ring 44 and sealing ring 62 into a configuration which is relatively stiff and amenable to subassembly.

The seal surface 54 which is engaged with the sealing toric 68 and the assembly surface 57 which is in closely spaced relation with the Belleville spring 88 are radially separated to facilitate assembly through the use of a two component stationary structure 46 and to provide greater flexibility in separately designing the sealing toric 68 and belleville spring 88. While surfaces 78,80,82,84,88a, and 88b have been referred to as axially facing surfaces, it is to be understood that such surfaces need not entirely face the axial directions to fall within the scope of the present invention. It is only necessary for the heretofore described axially facing surfaces to have an axial surface component to come within the present invention's purview. Such axial surface components will provide the present invention with the hereafter described features when those surface components conform to the limitations set forth herein. Radially facing surfaces 54 and 86 must, however, be true radial surfaces having no axially facing surface components.

Industrial Applicability

The seal arrangement 40 provides a highly effective and reliable seal for large diameter applications such as those having a diameter of ten inches or more. O-ring 66 frictionally links and seals rotatable seal ring 62 to retainer ring structure 44 so as to cause simultaneous rotation thereof. The sealing face portions 70 and 72 of the respective seal rings 62 and 64 are lapped according to well known machining procedures which facilitate sealing between the two engageable sealing faces. Since the body portions 74 and 76 of the seal rings, by example, constitute upwards of 90% of the seal rings' weight and volume, the relatively expensive alloying material which is needed only for the sealing face portions 70 and 72 is minimized. In addition to the body portions 74 and 76 being less costly, the composite seal rings' utilizing body and seal face portions are more rigid and more easily machined than seal rings made entirely of the sealing face portions' material.

The elastomeric toric 68 may, since it contacts only the radially facing surfaces 54 and 86, roll about its circular center line 68a and move in an unrestrained manner in either axial direction for axial movements of the seal ring 64 during its assembly and operation. Due to its propensity to roll, the toric 68 provides substantially no biasing force in the axial direction on such engaged seal ring 64. The toric 68 has an axially facing surface 96 which, when exposed to fluid pressure, contributes to the axial force acting on the engaged seal ring 64 in an axial direction tending to engage the seal face portions. Axially facing surfaces 82 and 84 on the engaged seal ring 64 act, when exposed to fluid pressure, to provide a net force in a direction tending to disengage the sealing face portions 70 and 72. Such net force is exactly counterbalanced by the pressure induced axial force exerted on the seal ring 64 by the elastomeric toric 68. When the elastomeric toric 68 rolls about its circular center line 68a, it exposes no more or no less axially facing surface area on the engaged seal ring 64 than was exposed to the fluid pressure prior to its rolling. Such is the case because the radially facing surfaces 54 and 86 have no axially facing area components. Frictional forces between the radially facing surface 54 and toric 68 and between the radially facing surface 86 and the toric 68, prevent rotation of seal ring 64. Since the axial surface 78 of the seal ring 62 is greater than the axial surface 80 of the seal ring 62, the seal ring 62 is biased axially outwardly toward the seal retainer 44 and all seal ring engagement force is supplied by forces acting on the seal ring 64. As such, the seal ring 64 is pressure balanced and held in a nonrotative manner.

The retaining tabs 91 secure the Belleville spring 88 in a closely spaced annular configuration with the seal ring 64 and the stationary structure 46 during assembly of the seal ring 64, toric 68, and the Belleville spring 88 with the stationary structure 46. Moreover, proper sizing of the tabs 91 ensures that the Belleville spring 88 is assembled in the intended orientation in which the spring's axial surfaces 88a and 88b face the illustrated directions. Reversal of the Belleville spring's axial surfaces preclude retention of the spring 88 by the retaining tabs 91 which prevents application of undesired biasing forces on the seal ring 64. The retaining ramp surfaces 55 and 89 cooperate, when juxtaposed, to prevent the escape of the toric 68 from between the seal ring 64 and seal retainer 50 during manipulation thereof preparatory to their assembly with the end plate 48.

The Belleville spring 88 provides substantially constant engagement force between the sealing face portions 70 and 72 so as to enable attainment of any optimum sealing force for typical axial positions of the seal rings 62 and 64. Also, since equal axially opposed areas of the Belleville spring 88 are subjected to the same coolant pressure which is transmitted through the openings 92, the Belleville spring 88 is also pressure balanced. Due to the pressure balancing, the force applied by the Belleville spring 88 is independent of the pressure of the coolant to which it is exposed. Such pressure balancing feature is extremely important since fluid pressures may vary substantially within space 42 depending on parameters such as outside temperature, coolant characteristics, severity of service, and effectiveness of the coolant handling apparatus.

It will now be apparent that an improved sealing arrangement 40 has been provided between relatively rotatable structures 12 and 14 which obstructs debris and foreign matter intrusion into and escape or leakage of coolant out of the sealed apparatus. The instant sealing arrangement 40 is precisely pressure balanced and engaged with constant force for any operational position of seal ring 64. As such, the present invention is most useful for sealing applications of large diameter but also performs effectively for sealing applications having relatively small diameters. During static and dynamic operation of seal rings 62 and 64, excellent contact sealing obtains from engagement of sealing face portions 70 and 72 with optimum force.

We claim:

1. A seal arrangement (40) for sealing between first and second relatively rotatable structures (12,14), said seal arrangement (40) comprising:
   a first (62) and a second (64) annular seal ring respectively having first and second axially opposably disposed engageable sealing face portions (70,72), said second seal ring (64) having a radially facing seal surface (86), a first axially facing surface (82), and a second axially facing surface (84) opposably arranged relative to and having a smaller axial area than said first axially facing surface;
   the second relatively rotatable structure (14) having a radially facing seal surface (54);
   means (68) for sealing between said second seal ring and the second relatively rotatable structure (14), said sealing means (68) being in exclusive contact with said radially facing seal surfaces (54,86) and having a pressure balancing surface (96) which is in fluid communication with said first and second axially facing surfaces (82,84), a portion of said pressure balancing surface (96) acting in concert with said second axially facing surface (84) to counterbalance the axial force exerted on said first axially facing surface (82) by a fluid; and
   means (88) for axially biasing said second seal ring (64) toward said first seal ring (62) with a substantially constant force for axial movements of said second seal ring (64) within a predetermined range.

2. The seal arrangement (40) of claim 1 wherein said second seal ring (64) has a radially inwardly facing periphery (64a) and a radially outwardly facing periphery (64b) between which an opening (92) extends, said opening (92) intersecting one of said peripheries axially between said sealing means (68) and said biasing means (88).

3. The seal arrangement (40) of claim 2 wherein said biasing means (88) has first (88a) and second (88b) axially facing surfaces of equal area facing opposite axial directions, said biasing means' axially facing surfaces being in fluid communication through said opening (92).

4. The seal arrangement (40) of claim 1, said biasing means (88) comprising:
   a Belleville spring (88) disposed axially between and in contact with said second axially facing surface (84) and the second relatively rotatable structure (14).

5. The seal arrangement (40) of claim 4, further comprising:
   a plurality of retaining tabs (91) connected to said second seal ring (64) for securing said Belleville spring (88) in a desired annular position relative to said second seal ring (64).

6. The seal arrangement (40) of claim 1 wherein the second relatively rotatable structure (14) includes an assembly surface (57) which is in closely spaced, surrounding relation with said biasing means (88), said seal surface (54) of said second structure (14) and said assembly (57) surface being radially separated.

7. The seal arrangement (40) of claim 1, said sealing means comprising:
   an elastomeric toric (68) which is rollable about its circular center line (68b).

8. The seal arrangement (40) of claim 1 wherein said first seal ring (62) and the first relatively rotatable structure (12) have juxtaposed notches (98,100) therein, said first seal ring's notch (98) having first (98a) and second (98b) axially facing sides and said first relatively rotatable structure's notch (100) having first (100a) and second (100b) axially facing sides, said first relatively rotatable structure's first axially facing side (100a) being radially longer than said first seal ring's first axially facing side (98a), said first seal ring's second axially facing side (98b) being radially longer than said first relatively rotatable structure's second axially facing side (100b).

9. The seal arrangement (40) of claim 1 wherein said first seal ring (62) has a first (78) and a second (80) axially facing surface, said first axially facing surface (78) being disposed on the same axial end of said first seal ring (62) as said first seal ring's sealing face portion (70), said first seal ring's second axially facing surface (80) being axially opposably disposed thereto, said first seal ring's first axially facing surface (78) having an axial area which is at least as great as said first seal ring's second axially facing surface (80).

10. The seal arrangement (40) of claim 1 wherein said first and second seal rings (62,64) further comprise first and second body portions (74,76) respectively, said first and second sealing face portions (70,72) constituting different materials than said body portions (74,76), said seal face portions (70,72) being joined to said first and second body portions (74 and 76), respectively.

* * * * *